United States Patent
Konno

(10) Patent No.: US 6,531,796 B1
(45) Date of Patent: Mar. 11, 2003

(54) MOTOR HAVING HIGH HEAT RESISTANT COATED TERMINALS

(75) Inventor: Mitsuo Konno, Kitasaku-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 0 days.

(21) Appl. No.: 09/618,220

(22) Filed: Jul. 18, 2000

(30) Foreign Application Priority Data

Apr. 7, 2000 (JP) ........................................ 2000-106378

(51) Int. Cl.[7] ........................ H02K 11/00; H02K 17/00; H02K 1/12
(52) U.S. Cl. ........................ 310/67 R; 310/71; 310/254
(58) Field of Search .......................... 310/71, 257, 254, 310/261, 67 R

(56) References Cited

U.S. PATENT DOCUMENTS

| | | | | |
|---|---|---|---|---|
| 4,115,715 A | * | 9/1978 | Muller | 310/156.05 |
| 4,259,603 A | * | 3/1981 | Uchiyama et al. | 310/68 B |
| 4,673,834 A | * | 6/1987 | Wrobel | 310/71 |
| RE34,001 E | * | 7/1992 | Wrobel | 310/71 |
| 5,610,458 A | * | 3/1997 | Baker et al. | 310/68 R |
| 5,663,276 A | * | 9/1997 | Yoneta et al. | 427/384 |
| 5,973,428 A | * | 10/1999 | Zakrocki et al. | 310/217 |
| 6,021,043 A | * | 2/2000 | Horng | 310/67 R |
| 6,023,117 A | * | 2/2000 | Chen | 310/68 R |
| 6,025,665 A | * | 2/2000 | Poag et al. | 310/89 |
| 6,129,528 A | * | 10/2000 | Bradbury et al. | 416/223 R |
| 6,191,506 B1 | * | 2/2001 | Wright | 310/42 |
| 6,271,638 B1 | * | 8/2001 | Erdman et al. | 318/439 |

FOREIGN PATENT DOCUMENTS

| | | | | |
|---|---|---|---|---|
| JP | | 358224536 A | * | 12/1983 |
| JP | | 406208808 A | * | 7/1994 |

* cited by examiner

*Primary Examiner*—Nestor Ramirez
*Assistant Examiner*—Julio C. Gonzalez
(74) *Attorney, Agent, or Firm*—Oliff & Berridge PLC

(57) ABSTRACT

To facilitate the assembling work of a motor and to enhance the reliability without limiting the structure of the motor, the iron core 12 of a stator 14 is insulated by insulators 15 and 16, a high heat-resistant resin is applied to a press-fitting portion of each terminal 17 to the insulator 16, and the terminal 17 is inserted into a boss 16a through the high heat-resistant resin so that a transfer of heat from the terminal 17 to the insulator 16 is suppressed. Accordingly, when an end portion of a conductive wire is wound around the terminal 17 and is subjected to the soldering work, even if the terminal 17 receives the heat and is heated, there is no generation of softening in the insulator 16 due to the heat. Accordingly, it is possible to prevent the "removal" or "tilt" of the terminal 17 caused by the heat.

5 Claims, 5 Drawing Sheets

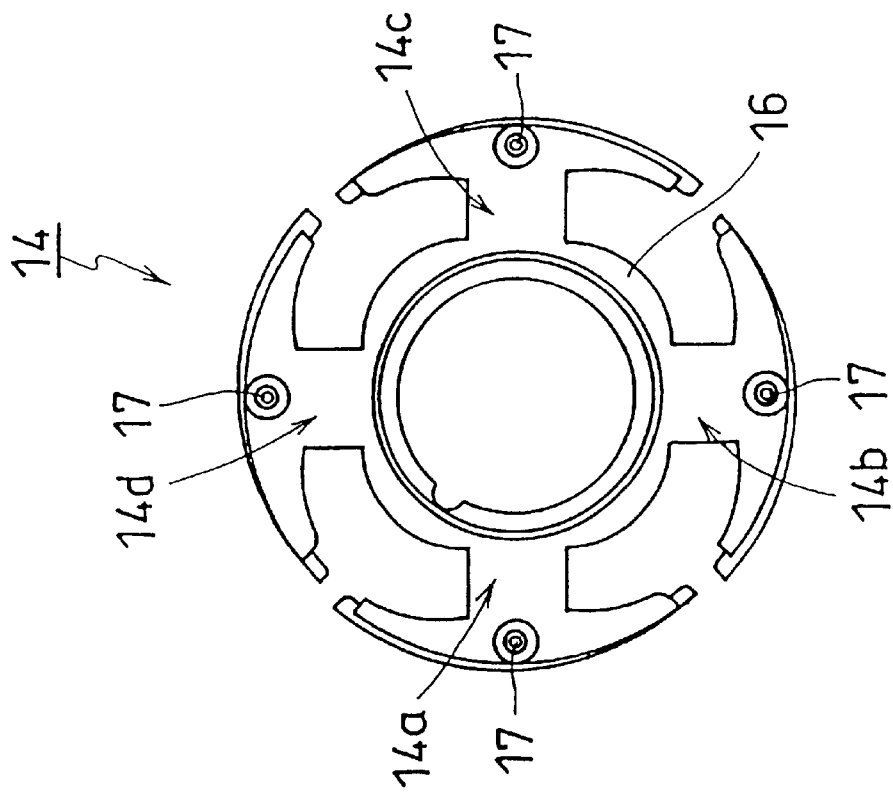
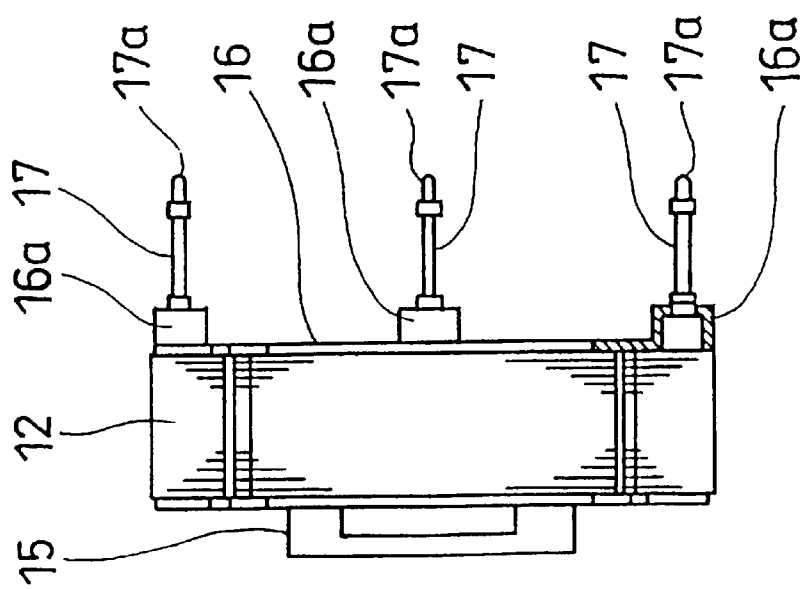

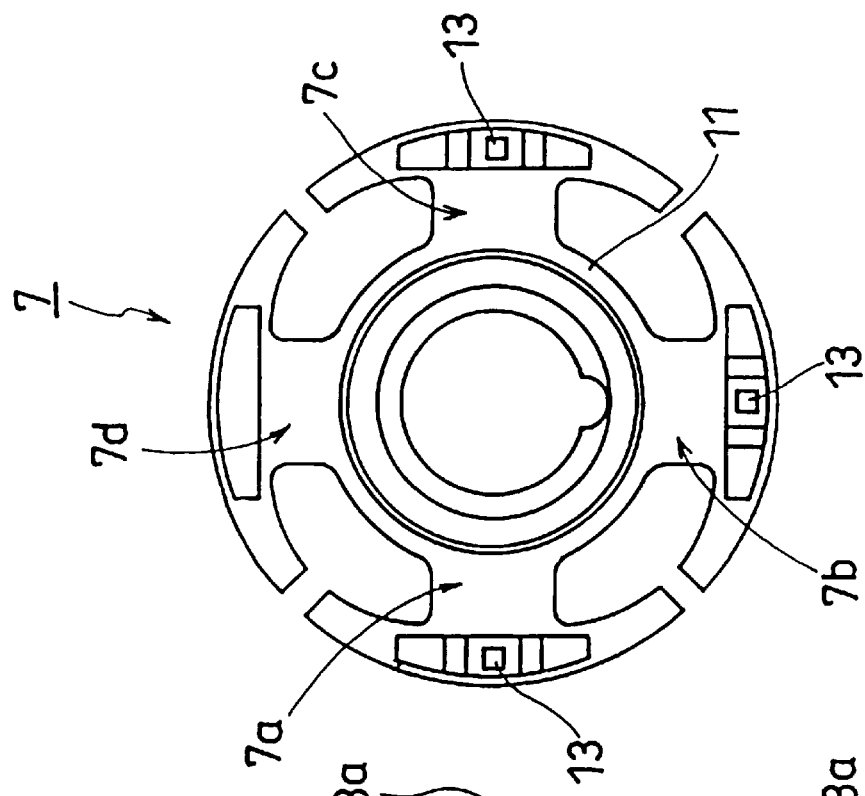
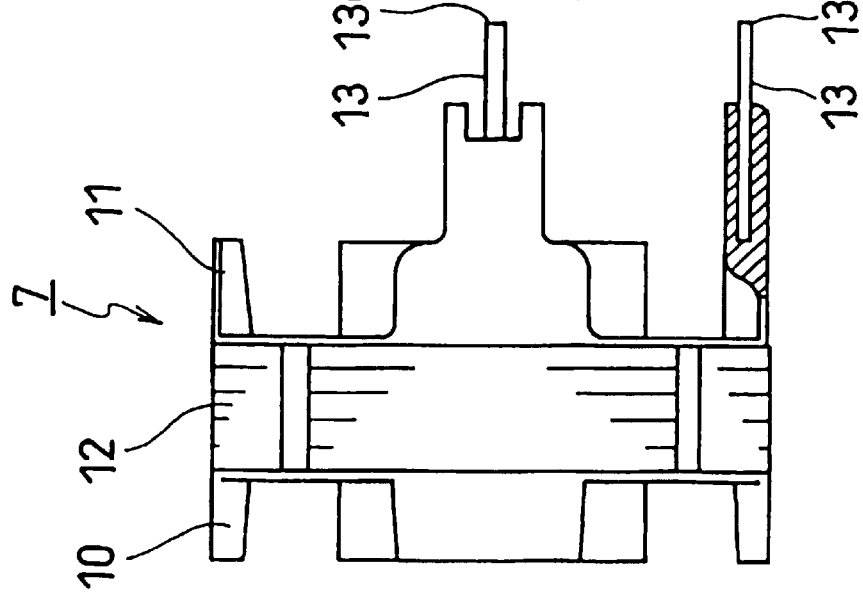
FIG. 5A RELATED ART
FIG. 5B RELATED ART

MOTOR HAVING HIGH HEAT RESISTANT COATED TERMINALS

BACKGROUND OF THE INVENTION

1. Field of the Invention

The present invention relates to a technique for facilitating an assembly property of a motor and enhancing its reliability.

2. Description of the Related Art

FIG. 4 shows a fan motor 1 as an example of equipment using a brushless DC motor. The fan motor 1 has a casing 5 fixed to a center of an air ventilation hole 3 provided in a body 2 by using four bridge portions 4. A PC board (printed circuit board) 6 provided with a drive circuit and a stator 7 are received in the interior of the casing 5. Then, a magnetic field generated by the stator 7 is applied to a magnet 9a of a rotor 9 formed integrally with a fan 8 to thereby cause the fan 8 to drivingly rotate about a shaft 8a passing through the stator 7.

FIGS. 5(A) and 5(B) are a side view and a front view of the stator 7. The stator 7 is provided with four pole portions 7a, 7b, 7c and 7d on which conductive wires are wound to form coils and an insulating structure for an iron core 12 with four pole insulators 10 and 11 molded in resin. Rod-like terminals 13 are press-fitted in three places 7a, 7b and 7c out of the four pole portions of the insulator 11. An end portion of the conductive wire that forms the coil is wound around and soldered to the terminal 13. Furthermore, the tip end portion 13a thereof is soldered to the PC board 6 (FIG. 4). Accordingly, the insulator 11 and the PC board 6 are fixed to each other through the terminal 13. Also, the coil windings and the PC board 6 are caused to be conductive to each other through the terminal 13.

By the way, the stator 7 shown in FIGS. 5(A) and 5(B) has a structure in which the terminal 13 is pressingly inserted and fixed to the insulator 11. For this reason, when the end portion of the conductive wire is wound around and soldered to each terminal 13, if the terminal 13 is subjected to its heat and heated, resin made insulator 11 is also heated and softened. As a result, the terminal 13 is threatened to be removed or tilted. The probability of occurrence of such inconvenience is increased as a result of an increase in temperature of the terminal 13 according to an extension in diameter of the conductive wire accompanied by the increase of heat amount needed for soldering work. Conventionally, in some cases, in order to prevent the occurrence of such inconvenience and to keep a satisfactory easy-assembly property and reliability of the motor, restrictions such as limiting the selection range of the conductive wire is provided in the structure of the motor.

SUMMARY OF THE INVENTION

In view of the foregoing problems, an object of the present invention is to facilitate the assembly property and enhance the reliability of a motor without placing restrictions on the structure of the motor.

According to a first aspect of the present invention for the purpose of solving the above problems, there is provided a motor wherein a terminal is inserted into a resin-made insulator for insulating an iron core of a stator, the terminal is fixed to a PC board and these components are received in a casing, characterized in that a high heat-resistant resin is interposed in a press-fitted portion of the terminal to the resin-made insulator.

According to the present invention, the heat-resistant resin suppresses the transfer of heat from the terminal to the resin-made insulator to thereby prevent the resin-made insulator from being softened by receiving the heat from the terminal. Thereby, the terminal is prevented from the "removal" or the "tilt" from the resin-made insulator.

According to a second aspect of the present invention, the high heat-resistant resin is applied to the press-fitted portion of the terminal to the resin-made insulator. With such an arrangement, it is possible to fix more positively the high heat-resistant resin and the terminal and to perform simultaneously the press-fitted of the high heat-resistant resin into the resin-made insulator with the press-fitted work of the terminal.

Furthermore, according to a third aspect of the motor of the present invention, a slit is formed at a portion of the resin-made insulator into which the terminal is press-fitted. In case of adopting a layout in which the portion of the resin made insulator into which the terminal is to be press-fitted is located in the vicinity of the outer circumferential end portion of the resin-made insulator, the slit exhibits the effect to replace the thin portion of the resin to prevent the molding defect.

Also, according to a fourth aspect of the present invention, a boss is formed as a portion of the resin-made insulator into which the terminal is press-fitted. With such an arrangement, it is possible to increase the amount of press-fitted (portion to be press-fitted) of the terminal to the resin-made insulator and to prevent more positively the "removal" or "tilt" of the terminal from the resin-made insulator.

According to a fifth aspect of the present invention, a rib is provided on the boss. With the provision of the boss, it is possible to reinforce the boss that becomes a base for supporting the terminal and to prevent more positively the "removal" or the "tilt" of the terminal from the resin-made insulator.

BRIEF DESCRIPTION OF THE DRAWINGS

FIGS. 1A and 1B are a side view and a frontal view of a stator of an embodiment of the present invention.

FIGS. 5A and 5B are a side view and a front view of a stator of the fan motor shown in FIG. 4.

DESCRIPTION OF THE PREFERRED EMBODIMENTS

Figure 1C:
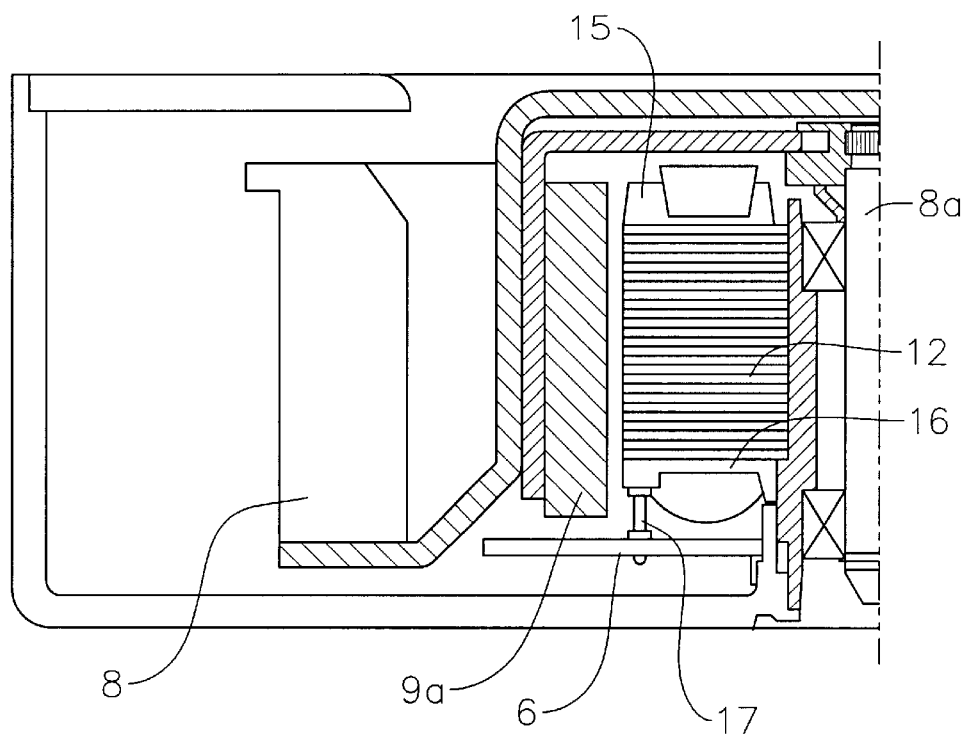
FIGS. 1C and 1D are a sectional view and a partial sectional view of a motor according to the invention.

An embodiment of the present invention will now be described with reference to the accompanying drawings. The same reference numerals are used to indicate the like members and components of the conventional art, and the detailed explanation therefor will be omitted.

Figure 1D:
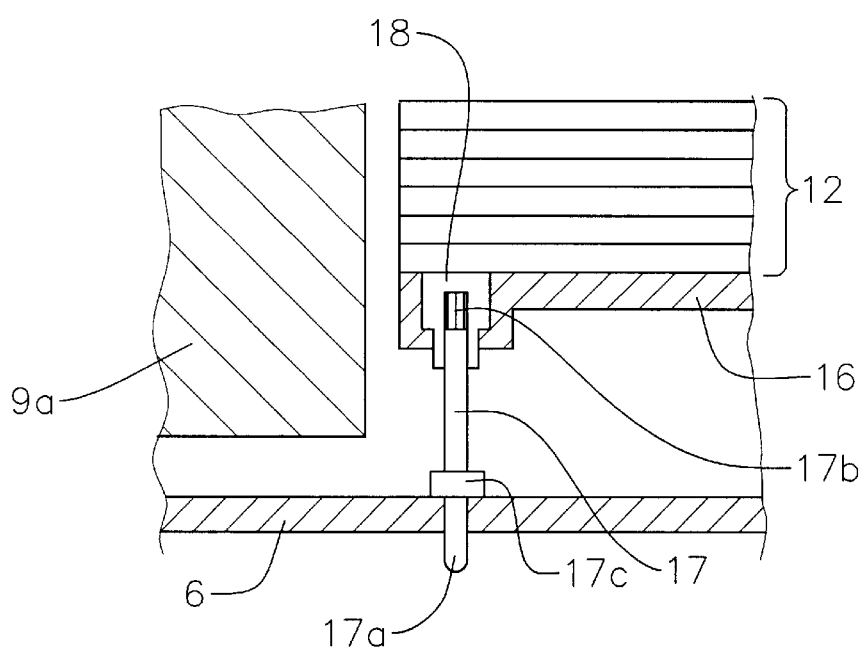

FIGS. 1(A) and 1(B) are a side view and a front view of a stator 14 respectively in accordance with an embodiment of the present invention and FIGS. 1(C) and 1(D) are a sectional view and a partial sectional view of a motor in accordance with the present invention. The stator 14 is provided with four pole portions 14a, 14b, 14c and 14d on which conductive wires are wound to form coils and has a structure in which an iron core 12 is insulated by four insulators 15 and 16 molded of resin. Also, a boss 16a is provided on each of the four pole portions 14a, 14b, 14c and 14d of the insulator 16 and rod-like terminal 17 is press-fitted in each boss 16a.

Figure 4:
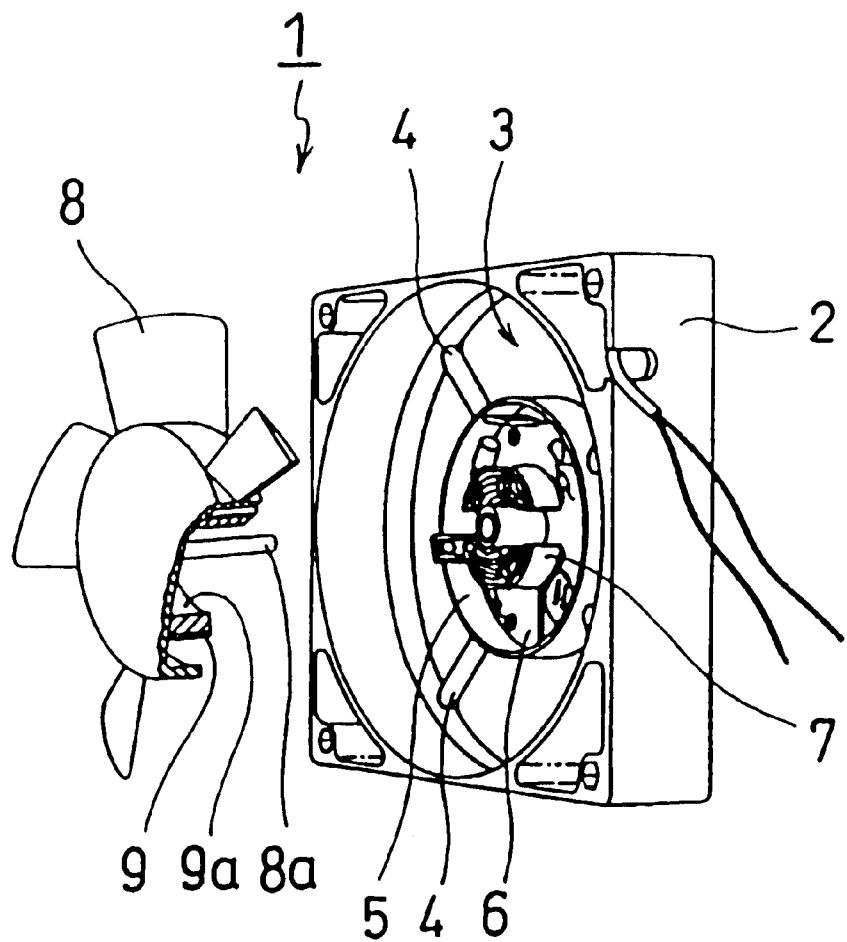
FIG. 4 is an exploded view of a fan motor that is an example of equipment using a conventional brushless motor.

An end portion of the conductive wire forming the coil is wound around and soldered to each terminal 17. Furthermore, a tip end portion 17a of the conductive wire is soldered to a PC board 6 (FIG. 4). Accordingly, also in this embodiment of the invention, the insulator 16 and the PC board 6 are fixed to each other through the terminals 17. Also, the coil windings and the PC board 6 are electrically connected to each other through the terminals 17.

Figure 2:
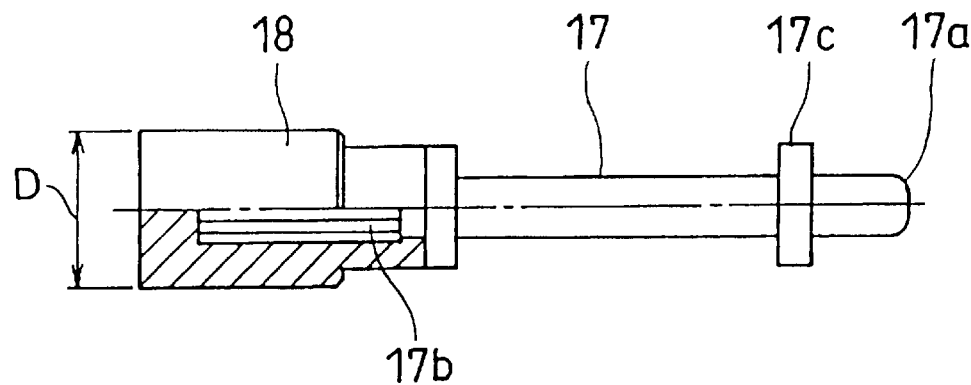
FIG. 2 shows a terminal to be inserted into the stator shown in FIG. 1.

FIG. 2 shows the terminal 17. A proximal end 17b of the terminal 17 is provided with a knurled portion that is larger in diameter than the other portion. A heat insulating member 18 made of high heat-resistant resin such as a fluorine resin is coated on the proximal end 17b. An outside diameter D of the heat insulating member 18 is set to have a shrink fitting relation with the inside diameter D' (see FIG. 3(A)) of the boss 16a. The heat insulating member 18 may be formed integrally with the terminal 17 or alternatively may be formed separately and the terminal 17 may be press-fitted in the heat insulating member 18. Note that a portion indicated as reference numeral 17c in FIG. 2 is a flanged portion in contact with the PC board 6 to effect the positioning function.

Figures 3A, 3B:
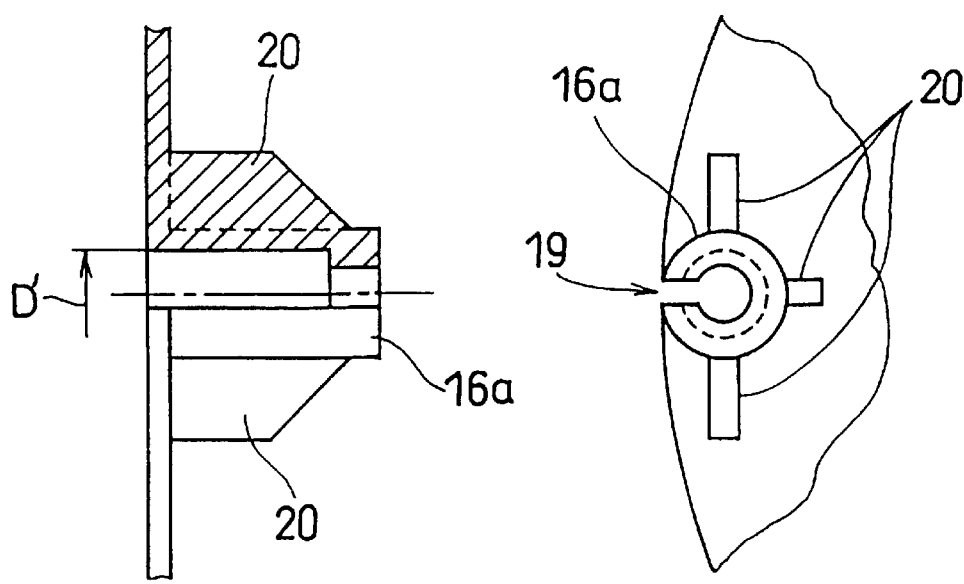
FIGS. 3A and 3B are a partially sectional view and a plan view of a boss formed in the insulator of the stator shown in FIG. 1.

FIGS. 3(A) and 3(B) show one example of the boss 16a provided in the insulator 16. A slit 19 is formed in the boss 16a. The slit 19 is formed by removing, in advance, a portion that becomes a thin part in order to avoid the molding defect that might occur in the thin part of the resin in the case where the boss portion 16a of the insulator 16 into which the terminal 17 is to be press-fitted is provided in the vicinity of the outer circumferential end portion of the insulator 16. Also, the slit 19 makes it possible to control the degree of elastic deformation of the boss 16a when the terminal 17 is to be press-fitted.

Furthermore, each rib 20 is provided on the boss 16a so that the boss 16a becoming a base for supporting the terminal 17 is reinforced to thereby firmly support the terminal 17. Incidentally, the boss 16a of the insulator 16 is provided if necessary. This is same as well as of the case for the slit 19 and the rib 20.

The operation and effect ensured in accordance with the embodiment of the present invention with the above-described arrangement is as follows. In the embodiment, the heat insulating member 18 is applied to the proximal end portion 17b that is the press-fitted portion of the terminal 17 in the insulator 16 and the terminal 17 is press-fitted in the boss 16a through the heat insulating member 18. Accordingly, the heat insulating member 18 makes it possible to suppress the transfer of heat from the terminal 17 to the insulator 16. Accordingly, even if the terminal 17 is heated when the end portion of the conductive wire is wound around the terminal 17 and the soldering is effected, there is no softening effect in the insulator 16 due to the heat. Accordingly, it is possible to prevent the "removal" or "tilt" of the terminal 17 to be caused by heat.

Since the heat insulating member 18 is applied on the end portion 17b that is the press-fitting portion of the terminal 17 by integral molding or press-fitting, it is therefore possible to effect the firm fixture between the heat insulating member 18 and the terminal 17. Also, the press-fitting of the heat insulating member 18 into the insulator 16 may be performed simultaneously with the press-fitting of the terminal 17. Accordingly, working processes may be reduced here than the process where the terminal 17 and the heat insulating member 18 are separately press-fitted into the boss 16a.

Furthermore, the slit 19 formed in the boss 16a that is the portion of the insulator 16 into which the terminal 17 is to be press-fitted so that, even if a layout where the boss 16a is provided in the vicinity of the outer circumferential end portion of the insulator 16 is adopted, it is possible to prevent molding defect of the insulator 16 that would occur at the thin part of the resin. Namely, it is possible to prevent degradation of the yield of the insulator 16 while enhancing the degree of freedom in the structure of the motor. In addition, the degree of the elastic deformation of the boss 16a is controlled by the slit 19, and it is possible to facilitate the press-fitting work and to enhance the insurance of the fixture of the terminal 17 to the boss 16a after the terminal 17 has been press-fitted in the boss 16a.

Also, in this embodiment, the boss 16a is provided as a portion of the insulator 16 in which the terminal 17 is to be press-fitted, so that the amount of press-fitting (portion to be press-fitted) of the terminal 17 to the insulator 16 is increased and the "removal" from the insulator 16 or "tilt" may be more surely prevented. The installation of the boss 16a is particularly effective in the case where the insulator 16 is thinned or in the case where the slit 19 is provided.

In addition, the rib 20 is provided on the boss 16a so that the boss 16a which becomes a base for supporting the terminal 17 is reinforced to thereby prevent the terminal 17 from the "removal" from the insulator 16 or from "tilt" more surely.

Incidentally, in the present embodiment, although the bosses 16a are provided on all the four pole portions 14a, 14b, 14c and 14d of the stator 14 so that the rod-like terminals 17 are press-fitted in the bosses 16a, it is possible to change the number of the terminals 17 in response to the rotary type of the motor. Then, if at least two terminals 17 are provided, it is possible to electrically connect the coil windings and the PC board 6 with each other through the terminals 17.

As described above, according to this embodiment, even if the terminal 17 is heated when the end portion of the conductive wire is wound around the terminal 17 and the soldering is effected, the softening of the insulator 16 due to heat is prevented and the "removal" or "tilt" of the terminal 17 due to heat may be prevented. Accordingly, it is possible to facilitate the assembling work of the motor and to enhance the reliability without limiting structure of the motor, such as limiting the selection range of the conductive wire.

In the structure in accordance with the embodiment of the present invention, even when the conductive wire (magnet wire) having a diameter of 0.65 mm is wound around the terminal 17 several times and is dipped in the solder bath and kept at a temperature of about 450° C. for about ten seconds and removed away therefrom, the terminal 17 does not come off from the insulator 16 or topple. For this reason, it is possible to electrically connect the coil windings and the PC board 6 with each other by using the conductive wire having the diameter of 0.65 mm.

Structured thus, the present invention has the following advantages. First of all, in the motor according to the first aspect of the present invention, without limiting the structure of the motor, it is possible to facilitate the assembly of the motor and to enhance the reliability.

In the motor according to the second aspect of the present invention, it is possible to ensure the fixture of the terminal relative to the resin-made insulator and the resin-made insulator, and to facilitate the assembly as well.

Also, in the motor according to the third aspect of the present invention, it is possible to prevent the induction of the molding defect in the resin-made insulator while enhancing the degree of freedom of the motor structure.

Furthermore, in the motor according to the fourth aspect of the present invention, it is possible to increase the amount of press insertion (portion to be press-fitted) to the resin-made insulator and to more positively prevent the "removal" from the insulator or "tilt" of the terminal.

In addition, in the motor according to the fifth aspect of the present invention, it is possible to more positively prevent the "removal" from the insulator or "tilt" of the terminal, to facilitate the assembly and to enhance the reliability of the motor.

What is claimed is:

1. A motor, comprising:

at least one terminal inserted into a resin-made insulator, for insulating an iron core of a stator, and the terminal is fixed to a printed circuit board, wherein the terminal is coated with a heat insulating member made of a high heat-resistant resin to form an integrated component, and the heat insulating member integrated with the terminal is press-fitted into the resin made insulator;

a boss formed at a portion of the resin-made insulator into which the heat insulating member integrated with the at least one terminal is press-fitted;

a slit formed at each boss to control elastic deformation of each boss; and a rib formed on an outer circumference of each boss to reinforce each boss.

2. The motor according to claim 1, wherein the high heat-resistant resin is a fluorine resin.

3. The motor according to claim 1, wherein the boss and the rib are molded together with the insulator.

4. The motor according to claim 1, wherein the terminal is provided at one end portion with a knurl.

5. The motor according to claim 1, wherein the motor is used for a fan motor.

* * * * *